(12) United States Patent
Harrington et al.

(10) Patent No.: US 6,475,368 B2
(45) Date of Patent: Nov. 5, 2002

(54) METHOD OF AQUEOUS ANODIZING ALUMINUM SUBSTRATES OF SOLID CAPACITORS

(75) Inventors: Albert Kennedy Harrington, Mauldin, SC (US); Brian John Melody, Greer, SC (US); John Tony Kinard, Greer, SC (US); Philip Michael Lessner, Simpsonville, SC (US); David Alexander Wheeler, Williamston, SC (US)

(73) Assignee: Kemet Electronics Corporation, Greenville, SC (US)

( * ) Notice: Subject to any disclaimer, the term of this patent is extended or adjusted under 35 U.S.C. 154(b) by 56 days.

(21) Appl. No.: 09/799,807

(22) Filed: Mar. 7, 2001

(65) Prior Publication Data

US 2002/0125143 A1 Sep. 12, 2002

(51) Int. Cl.$^7$ ............................ C25D 11/12; C25D 11/16
(52) U.S. Cl. ................ 205/118; 205/128; 205/153; 205/175; 205/209; 205/224; 205/229; 205/332
(58) Field of Search ................ 205/118, 122, 205/128, 139, 153, 175, 209, 224, 229, 332

(56) References Cited

U.S. PATENT DOCUMENTS

| | | | |
|---|---|---|---|
| 1,906,691 A | | 5/1933 | Lillenfeld |
| 4,093,972 A | | 6/1978 | Voyles |
| 4,159,927 A | * | 7/1979 | Bernard et al. ............... 204/58 |
| 4,203,194 A | | 5/1980 | McGrath |
| 4,288,842 A | | 9/1981 | Voyles |
| 4,481,084 A | | 11/1984 | Chen et al. |
| 4,715,936 A | | 12/1987 | Florio |
| 5,382,347 A | * | 1/1995 | Yahalom ..................... 205/50 |
| 6,038,124 A | * | 3/2000 | Uchi et al. .................. 361/509 |
| 6,346,185 B1 | * | 2/2002 | Kinard et al. ............... 205/316 |

* cited by examiner

*Primary Examiner*—Nam Nguyen
*Assistant Examiner*—William T. Leader
(74) *Attorney, Agent, or Firm*—Banner & Witcoff, Ltd.

(57) ABSTRACT

A method of anodizing an aluminum substrate comprising heating the substrate to a first temperature of 200° C. to about 380° C.; suspending the substrate into a first electrolyte and applying a first anodizing current to the first electrolyte; rinsing the substrate; heating the substrate to a second temperature of 200° C. to about 380° C.; and suspending the substrate into a second electrolyte and applying a second anodizing current to the second electrolyte, wherein the first electrolyte and second electrolyte each comprise an aqueous solution of at least one salt of alpha-hydroxy acid.

15 Claims, 1 Drawing Sheet

Hydration Resistance of A. Adipate versus B. Citrate

Hydration Resistance of A. Adipate versus B. Citrate

METHOD OF AQUEOUS ANODIZING ALUMINUM SUBSTRATES OF SOLID CAPACITORS

FIELD OF THE INVENTION

The invention is directed to a method of aqueous anodizing aluminum substrates for solid capacitors.

BACKGROUND OF THE INVENTION

Electrolytic capacitors have long been recognized as the most volumetrically efficient type of capacitor available i.e., they have the highest capacitance x voltage product for a given volume. This high capacitance x voltage product (commonly called "CV") is made possible by the extremely thin anodic oxide dielectric layer present in electrolytic capacitors.

Capacitors containing very high surface area electrodes and employing polarization/depolarization of the so-called Helmholtz double layer formed by the contact of these high surface area electrodes and a conductive liquid or gel electrolyte may have extremely high capacitance values per unit volume but these double-layer capacitors are limited to very low voltages (1–3 volts) per cell by the electrolytic decomposition voltage of the electrolyte. The fine pore structure of the electrodes combined with the electrical conductivity limitations of liquid electrolytes results in relatively high equivalent series resistance (ESR) for double-layer capacitors. Modern electronic circuits generally require low-ESR devices, thus electrolytic capacitors remain the devices of choice for applications requiring capacitors having a high capacitance x voltage (CV) product per unit volume.

The introduction of so-called "solid" tantalum capacitors, i.e. anodized porous tantalum compacts impregnated with manganese dioxide cathode material, in the early 1950's made possible the use of electrolytic capacitors in higher frequency circuits requiring low equivalent series resistance as well as high CV density (i.e., high CV product per unit volume) devices. The lower ESR characteristic of these capacitors is due, in large part, to the 1–2 order of magnitude higher conductivity of the manganese dioxide cathode material compared with the liquid electrolyte cathode material used in older "wet" electrolytic capacitor designs.

The density of component placement on circuit boards increased greatly with the widespread adoption of "surface mount" circuit board construction in the 1980's. Surface mount devices attach directly to the circuit board conductive traces, via solder or conductive adhesive attachment, thereby reducing resistive losses and inductance associated with components fabricated with wire leads. Surface mount solid capacitors were introduced by major manufacturers in the 1970's and grew to be the dominant form of solid capacitors by the end of the 1980's.

Surface mount solid capacitors have traditionally been fabricated from porous powder metallurgy tantalum compacts which have been anodized, impregnated with manganese dioxide, and coated with carbon and conductive paint, usually containing silver powder, before final encapsulation.

Surface mount tantalum capacitors are fabricated in two general configurations, molded body and conformally-coated devices. Molded body devices have the general construction described in U.S. Pat. No. 4,288,842 which teaches a silver paint-coated tantalum anode body encapsulated in a molded, insulating material case having a pair of wrapped electrical leads extending from the case walls and connected to the encapsulated anode body via welding or conductive adhesive, etc. Conformally-coated surface mount tantalum capacitors fall into two sub-categories depending on the type of electrode terminations employed. One type of termination follows the general construction described in U.S. Pat. No. 4,093,972 in which metallic end caps are attached to the insulating polymer conformally coated anode body to provide external electrode connections. The other type of termination follows the general construction described by U.S. Pat. No. 4,203,194 in which the insulating polymer conformally coated body is provided with external electrode connections via plating processes.

The surface mount solid capacitors, described above, employ anode bodies fabricated from powder metallurgy tantalum anode compacts. It has long been recognized that "solid" capacitors containing etched and anodized aluminum foil anode coupons in place of the powder metallurgy porous tantalum anodes bodies would not only have the advantage of the much lower cost of aluminum as an anode material but would also exhibit a low equivalent series resistance (ESR) due to the very short electrical path length (generally on the order of 0.001 to 0.002 inch) from the inner to the outer portion of the etch structure of the aluminum foil compared to the generally much longer electrical path length present in powder metallurgy tantalum anodes. A "solid" aluminum capacitor is described in U.S. Pat. No. 1,906,691 in which the liquid electrolyte traditionally present in aluminum electrolytic capacitors is replaced with a semi-conducting solid such as cuprous oxide or sulfide. Such fabrication methods were expensive and difficult to control. The product produced by these methods is variable, depending upon the exact stoichiometry of the semi-conductor coating, etc.

When "solid" tantalum capacitors having manganese dioxide cathodes produced via pyrolysis of manganese nitrate-solutions contained within the porous anode bodies were introduced in the 1950's, attempts were made to coat anodized aluminum capacitor foil coupons with manganese dioxide via the same pyrolysis method used to fabricate solid tantalum capacitors. The high moisture, temperature, and acidity associated with the pyrolysis process proved to be excessively aggressive and the electrical performance of the resulting devices was found to be inadequate to meet the demands of the electronics marketplace.

With the development of reasonably stable organic semi-conductors and intrinsically conductive polymers in the 1970's and 1980's, practical "solid" aluminum capacitors became possible and a line of solid aluminum capacitors having a cathode material consisting of an amine/TCNQ charge-transfer salt, organic semi-conductor was introduced in the early 1980's by the Sanyo Corporation (the "OS-Con" capacitor line). More recently, intrinsically conductive polymers such as polyaniline, polypyrrole, polythiophene, and their derivatives, doped with strong organic acids, have been utilized as cathode materials in both tantalum and aluminum electrolytic capacitors.

Organic charge-transfer salts and intrinsically conductive polymers, while more expensive than the manganese dioxide cathode material present in conventional solid tantalum capacitors, offer several advantages as solid cathode materials. They do not support combustion as does manganese dioxide, they have a range of conductivity such that they may be made significantly more conductive than manganese dioxide, and as stated above, they may be applied under conditions which are not so destructive to aluminum anode materials.

The high conductivity organic polymer cathode material and the short conductive path length inherent with etched, and anodized aluminum anode foil have been combined to yield solid capacitors having very low equivalent series resistance. Devices of this type have been constructed having ESR values below 0.005 ohm and having a volume of only a small fraction of a cubic centimeter.

The preferred surface mount configuration of solid aluminum capacitors having conductive polymer cathodes usually consist of a stack of etched and anodized aluminum foil coupons partially coated with conductive polymer, graphite, and conductive paint layers and with the cathode coatings bonded together and attached to a lead frame with conductive adhesive to form a negative terminal. The uncoated ends of the etched and anodized coupons are welded to each other and to a portion of a lead frame to form a positive terminal after encapsulation and singulation of the device. The devices are usually encapsulated by molding using a non-conductive polymer, usually an epoxy compound. The individual devices are singulated by post-molding removal of the non-electric terminal portion of the lead frame used to support the anode coupons during device construction.

The aluminum anode coupons used to fabricate surface mount aluminum capacitors are usually cut from the large master rolls of etched and anodized foils used by the aluminum capacitor industry. The coupons may be punched from a roll of foil or, after slitting to a proper width, by cutting the foil to appropriate lengths. Before the coupons are fabricated into capacitors, the cut or slit edges have to be anodized in order to coat these edges with insulating oxide (the anode coupons would be short-circuited at the edges without this anodizing step). Multiple cut aluminum anode coupons are fastened to electrically conductive strips or bars via welding, and a number of these strips or bars are fastened a frame or process head for bulk edge anodizing. The frame or process head of coupons is then suspended above a tank of electrolyte with the coupons immersed in the electrolyte, and current is passed through the coupons (coupons biased positive) to produce the insulating anodic oxide film on the edges of the coupons. This edge anodization is usually carried out in an electrolyte of similar composition to those used to anodize low voltage aluminum capacitor foil.

Currently, all of the solid surface-mount capacitors containing aluminum anodes and a conductive polymer are rated as 25 volt or less devices. Most low voltage aluminum capacitor foil is anodized in aqueous solutions of organic acid salts. The ammonium salts of adipic acid and citric acid are the salts most commonly used for this purpose.

One factor complicating the edge anodizing of cut surface mount aluminum anode foil coupons is the porosity of the material. The etch tunnel structure of low voltage anode foil is extremely porous for the purpose of maximizing foil surface area and hence, capacitance per microscopic foil surface area and volume. When cut anode foil coupons are suspended in anodizing electrolyte, the electrolyte has a tendency to wick up the foil and create and electrical short-circuit to the carrier strip or bar from which the anodes are suspended during the edge anodizing step. In order to limit wicking of the edge anodizing electrolyte, a narrow stripe of masking material is usually applied to the anode coupons prior to the edge anodizing step. This masking material may be an epoxy, a silicone resin, an epoxy-silicone, a polyimide, a fluoropolymer, etc., so long as the material forms an effective mask upon cross linking, solvent evaporation, or melting without producing corrosive anionic by-products which would attack the foil during the anodization step.

One of the most important steps in the fabrication of surface mount aluminum electrolytic capacitors containing conductive polymer cathode material is the anodizing step carried-out after the anodized anode foil coupons are welded to carrier bars. As mentioned above, this step is carried-out to coat the edges of the coupon with anodic oxide and to help repair any cracks in the oxide due to handling, cutting, welding, etc. In theory, the post bar mounting, edge-anodizing step may be carried out in a wide variety of electrolyte solutions so long as the solution used produces a barrier (electrically insulating) aluminum oxide film. In mass production practice, however, several constraints exist which eliminate many materials from consideration as ionogens. The ionogen must be readily available in high purity; it must not contain halogens or sulfates above low ppm levels. The ionogen must be readily soluble in water and must be of low toxicity and vapor pressure. The ionogen must be effective in aqueous solutions, which do not contain a significant amount of organic co-solvent (below about 2%) in order to hold chemical and rinsing costs down to reasonable levels for mass production use.

Generally speaking, the electrolytes which are used to anodize etched aluminum foil to produce the commercially available anodized anode foil used in wound, liquid electrolyte-impregnated capacitors may be used to anodize the edges of surface mount capacitor anode coupons.

The aqueous electrolytes used to anodize aluminum capacitors foil commercially include boric acid and borate salts and carboxylic acid salts. Boric acid, borax (sodium tetraborate), and ammonium borates have been used to anodize aluminum since the early 1900's. They are still used in the production of high voltage capacitor foils but borates have largely been replaced by carboxylic acid salts for the anodizing of low and medium voltage capacitor foils due to the high cost of (high concentrations must be used) of borates as well as the toxicity of these materials. Borates also tend to precipitate in the etch tunnels of highly etched aluminum foils, such as are used in low-voltage capacitors, blocking off these tunnels and reducing the capacitance of low voltage foils. Aluminum is somewhat soluble in borate solutions and therefore anodizing solutions based on borates must be replaced frequently due to increasingly high aluminum content.

Carboxylic acid salts, usually the ammonium salts, have largely replaced boric acid/borates as the ionogens in anodizing electrolytes for use in the commercial production of anodized capacitor foil. Malic, tartaric, and citric acid salts were among the first carboxylic acid salts used to anodize capacitor foil. As pointed out in U.S. Pat. No. 4,715,936, carboxylic acid containing an alpha-hydroxy group (such as citric, malic, and tartaric acids) tend to attack/dissolve any hydrated oxide produced during the anodizing, and while salts of these acids tend to produce highly hydration-resistant anodic aluminum oxide, the dissolution of the hydrated oxide results in low current efficiency and rapid solution loading with dissolved aluminum. The alpha-hydroxy carboxylic acid salts have been replaced by dicarboxylic acid salts, such as the ammonium salt of adipic acid. Aluminum tends to very insoluble in dicarboxylic acid salt solutions and thus very high current efficiency is obtained during aluminum foil anodizing in dicarboxylic acid salt solutions.

However, there exists a major disadvantage with capacitor anode foil which has been anodized in a dicarboxylic acid salt solution, such as adipic acid salt solution. The anodic oxide produced in dicarboxylic acid salt solutions (such as an adipate solution) is very susceptible to hydration degradation, i.e., the anodic oxide exhibits a strong tendency to react with moisture in its surroundings to yield a hydrated oxide having impaired insulating properties (high leakage current) and elevated dielectric losses (high dissipation factors). The hydration sensitivity of anodic aluminum oxide films produced in adipate or other dicarboxylate anion-containing solutions, is sufficiently large that post-anodizing methods of imparting hydration resistance to the anodic oxide have been developed, such as those described in U.S. Pat. No. 4,481,084, which include heat-treating the anodic oxide to 400° C. to 550° C. and re-anodizing, preferably in a phosphate-containing electrolyte.

A high-efficiency anodizing method, which produces a hydration-resistant anodic oxide film on aluminum, has been developed and described in U.S. Pat. No. 4,715,936. This method employs amino acids, preferably dicarboxylic amino acids having a 2-amino group (alpha amino group) as the ionogen in aqueous solution. Aqueous solutions of 2-amino dicarboxylic acids have been found to give rise to crystalline (hydration resistant) anodic aluminum oxide with minimal dissolution of the oxide and high resulting electrical efficiency.

The disadvantages of several of the anodizing methods/electrolyte solutions used by the capacitor foil industry may be magnified when these methods/materials are employed to anodize the edges of cut foil coupons welded to process bars and with masking material applied to them. Heat-treatment of the welded and masked coupons to 400° C. to 550° C., as suggested, in U.S. Pat. No. 4,481,084, is impractical due to decomposition of the masking material and warping of the process bars/fixtures supporting the coupons. Edge anodizing of the bar-mounted and masked aluminum anode foil coupons in dicarboxylic acid salt solutions repairs cracks in the oxide film (from handling damage) while the anodic oxide grows on the cut edges of the coupons. Unfortunately, the use of a dicarboxylic acid salt anodizing solution (such as ammonium adipate solution) gives rise to an anodic oxide, which is highly susceptible to hydration, especially if a dicarboxylic acid salt solution was used to anodize the foil initially.

The use of aqueous (no organic co-solvent) phosphate solutions results in the deposition of solid phosphates on the bodies of the coupons along the electrolyte/air interface unless very dilute (and difficult to control) solutions are employed. The more recently developed anodizing electrolyte solutions containing dicarboxylic amino acids, such as are described in U.S. Pat. No. 4,715,936, produce anodic oxide on the edges of the aluminum coupons without airline corrosion nor solution control problems, but due to the non-aggressive nature of these materials to any hydrated oxide present, (if, for example, the foil from which the anode coupons were cut was previously anodized in an ammonium adipate solution), coupon edge anodizing imparts little in the way of hydration resistance to the anodic oxide already present on the coupons prior to the edge anodizing step.

SUMMARY OF THE INVENTION

The invention is directed to method of anodizing an aluminum substrate comprising heating the substrate to a first temperature of about 200° C. to about 380° C.; suspending the substrate into a first electrolyte and applying a first anodizing current to the first electrolyte; rinsing the substrate; heating the substrate to a second temperature of about 200° C. to about 380° C.; and suspending the substrate into a second electrolyte and applying a second anodizing current to the second electrolyte, wherein the first electrolyte and second electrolyte each comprise an aqueous solution of at least one salt of alpha-hydroxy acid.

The aluminum substrate may be a pre-anodized substrate having cut edges or an un-anodized substrate. The anodizing temperature is generally from about 25° C. to 90° C. Preferably the first and second temperatures are 300° C. to about 375° C.

It is to be understood that both the foregoing general description and the following detailed description are exemplary and explanatory only and are not restrictive of the present invention as claimed.

DETAILED DESCRIPTION OF THE PREFERRED EMBODIMENTS

Figure 1:
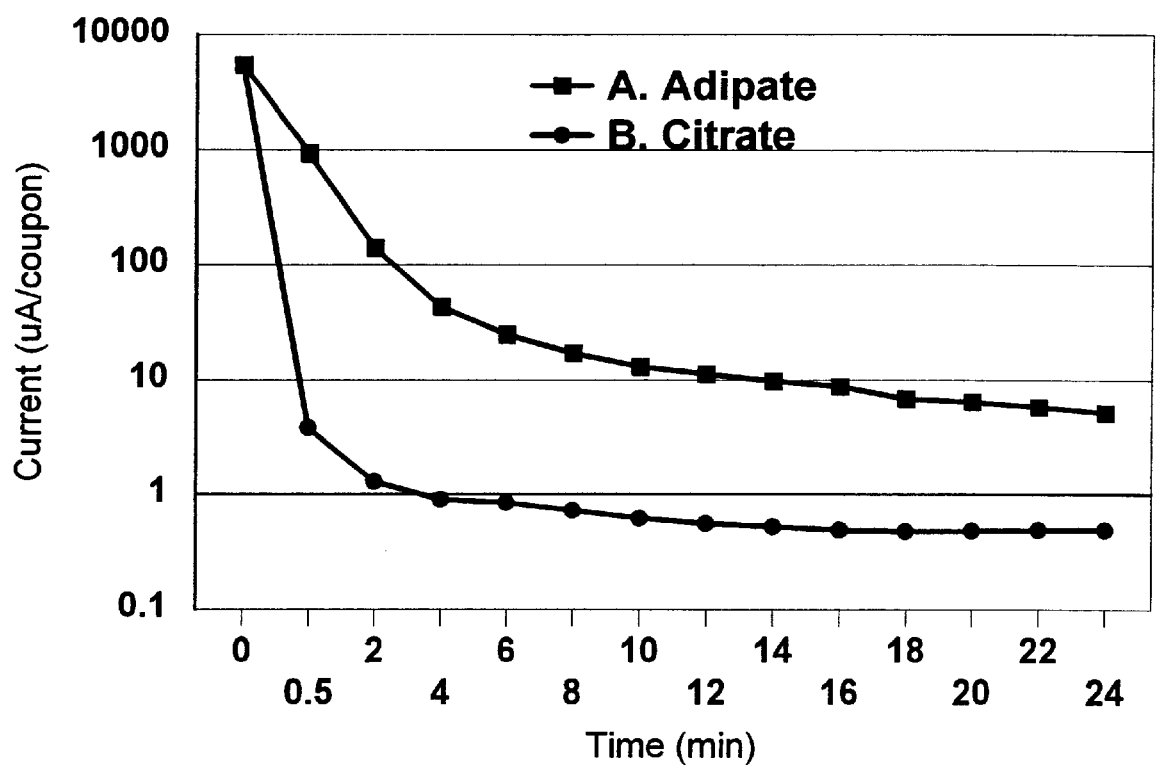
FIG. 1 depicts the hydration resistance of ammonium adipate versus ammonium citrate.

It was discovered that so-called "stacked foil" conductive polymer-containing "solid" capacitors may be treated to produce an anodic oxide film to the edges of the coupons, repair any cracks in the anodic oxide from handling, and impart hydration resistance to the anodic oxide already present on the coupons. The stacked foil conductive polymer-containing "solid" capacitors are typically prepared from anode foil coupons cut from etched and anodized foil and mounted on carrier bars (by welding or other means) for processing. The anodic oxide film may be produced even if the foil from which the coupons were cut was anodized in an electrolyte solution, which does not normally impart hydration resistance, such as a solution of a salt of a dicarboxylic acid (for example, ammonium adipate solution).

The steps of the invention include:
1) A first heat-treatment step;
2) A first anodizing and rinsing step;
3) A second heat-treatment step; and
4) A second anodizing and rinsing step.

Coupons are cut and welded to a process bar. Masking is applied to prevent wicking of the materials used to produce the conductive polymer into the weld zone of the coupons. The coupons are then heat-treated at a temperature sufficiently high to drive-off a significant amount of water of hydration in the anodic oxide (if present) but low enough to prevent decomposition of the organic masking material. The temperature of this first heat treatment is typically from about 200° C. to about 380° C., preferably about 300° C. to about 375° C. Typical times for the heat treatment are about 15 to about 30 minutes, but the actual time necessary is within the skill of the art. In general, higher temperatures require shorter thermal exposure times.

The coupons are then immersed in an anodizing electrolyte. The electrolyte is an aqueous solution of at least one alpha-hydroxy acid salt. Suitable alpha-hydroxy acid salts include the salts of citric acid, malic acid, and tartaric acid, and mixtures thereof. The preferably salt is a salt of citric acid such as dibasic ammonium citrate. Other possible salts are water soluble amine salts of citric acid, malic acid, tartaric acid, etc., and mixtures thereof. The solution pH is preferably between about 4 and about 7. The concentration of the alpha-hydroxy salt in solution is typically about 0.03 wt % to about 10 wt %, preferably about 0.1 wt % to about 2 wt %. A preferred electrolyte contains about 1 wt % dibasic ammonium citrate in water. Small amounts of non-ionic wetting agents or surfactants may also be present.

Voltage is applied to the coupons until the current decays to a predetermined low value typically a few microamperes or less per coupon. The applied voltage is generally equal to or slightly less than the voltage used to anodize the foil from which the coupons were cut. The applied voltage is within the skill of the art and is typically about 65% to about 100%, preferably about 75% to about 95%, of the original anodizing voltage.

The temperature of the electrolyte is not critical, but should not vary more than about 5° C. up or down. The temperature may be about 25° C. to 90° C. Slightly higher voltages are required for lower electrolyte temperature. The coupons are then rinsed in distilled or de-ionized water to remove the anodizing solution.

The edge-anodized and rinsed coupons are then heat-treated a second time. The temperature of the second heat treatment is typically from about 200° C. to about 380° C., preferably about 300° C. to about 375° C., for about 15 to 30 minutes. Again, the actual time needed is within the skill of the art and higher temperatures require shorter thermal exposure times.

The coupons, after cooling, are then immersed in a second anodizing electrolyte. The second electrolyte is also an aqueous solution of at least one alpha-hydroxy acid salt. Solutions of alpha-hydroxy acid salts are described above for the first electrolyte. The second electrolyte may be the same or different from the first electrolyte. Preferably the first electrolyte and the second electrolyte are the same.

Voltage is applied to the coupons until the current decays to a predetermined value typically a few microamperes or less per coupon. The end currents obtained for this second anodizing step are generally lower than for the first edge anodizing step, described above. The voltages and temperatures employed are in the same ranges as for the first anodizing step. The anode coupons are then rinsed in distilled or deionized water to remove the anodizing solution and are then ready for further processing.

Anode coupons processed according to the invention are found to have greatly enhanced hydration resistance compared with coupons that are edge anodized in, for example, ammonium adipate solution. Hydration resistance is imparted to anode foil coupons during the edge anodizing step, even if the foil from which the coupons are cut was anodized in a solution which does not impart hydration resistance, such as a solution of ammonium adipate or solutions of ammonium salts of dicarboxylic acids such as ammonium sebacate, ammonium azelate, ammonium succinate.

The temperature range employed for the heat-treatment steps is much below that of prior art, for example, the 400° C. to 550° C. temperature range specified in U.S. Pat. No. 4,481,084, such that organic masking materials, carrier bars, etc., are not adversely effected by the heat-treating steps. Moreover, because the anode coupons are already anodized prior to the edge anodizing step, and much of the water of hydration is removed during the heat-treating steps, the low anodizing efficiency usually associated with alpha-hydroxy acid salt solutions is not observed during the anodizing steps of the invention, and the anodizing solutions of the invention do not dissolve aluminum from the anode coupons at an excessive rate (long anodizing solution life).

The anodizing solutions of the invention containing aqueous solutions of salts of alpha-hydroxy acids, especially citric acid, do not tend to cause corrosion/precipitation on the coupon surface, along the electrolyte solution/air interface, as do aqueous (no organic co-solvent) phosphate solutions, so higher concentrations of ionogen/low solution resistivities may be employed.

Although not wishing to be bound by any theory, it is believed that the heat-treatment steps drive-off the majority of any water of hydration present in the anodic oxide coating the foil from which the coupons are cut and the alpha-hydroxy dicarboxylic acid salt electrolyte solution tends to attack/dissolve any residual hydrated oxide, resulting in a much higher degree of crystallinity and hydration resistance after edge anodizing according to the invention.

EXAMPLES

The invention will be further described by reference to the following examples. These examples should not be construed in any way as limiting the invention.

Example 1

Surface mount aluminum electrolytic capacitor coupons were cut from a roll of etched and anodized anode foil which had been anodized to 18 volts by a commercial foil producer employing ammonium adipate anodizing solutions. The cut coupons were welded to carrier bars, organic masking material was applied, and the bars were mounted in "process heads" or frames for further processing. The anode coupons were split into two groups, control group "A" and test group "B".

Both groups were initially heat-treated at 300° C. for 30 minutes, in a circulating air oven. The control group A was heat-treated to demonstrate that the heat-treatment, alone, was not responsible for the observed results.

Both groups were then anodized. Group "A" was anodized in a solution of ammonium adipate known to give high efficiency anodizing and low end current (industry standard). Group "B" was anodized in a 1 wt. % solution of dibasic ammonium citrate. Both anodizing steps were conducted at 13 volts, 50° C., for approximately 10 minutes. After the above anodizing, both of the groups were rinsed in de-ionized water to remove the electrolyte solutions.

Both groups were then heat-treated in a circulating air oven at 300° C. for 30 minutes. Following this second heat-treatment, both groups were again anodized in the same solutions used in the first anodizing step for approximately 10 minutes and then rinsed in de-ionized water.

Both groups were then immersed in heated de-ionized water (70° C.) for about 70 minutes in order to initiate hydration reactions in susceptible anodic oxide.

Both groups were then returned to their respective anodizing solutions and 13 volts was applied for a period of 24 minutes. The current passing through each group of parts (same number of coupons per group) was recorded periodically. The graph of current versus time at voltage for each group is presented in FIG. 1.

It is readily observed that the group "B" parts, processed according to the method of the invention, demonstrate greatly enhanced resistance to hydration as indicated by the much lower current passing through these parts compared with the control group "A." After 30 seconds, the current was approximately 5 microamperes/coupon for the test anodes versus approximately 1,000 microamperes/coupon for the control. After 24 minutes, the current passing through the controls was still more than 10 times that passing through the test parts.

Thus, the process of the invention is successful in imparting hydration resistance during the heat-treatment/edge anodizing process and without undue loss in anodizing efficiency, without the use of excessive temperatures, and without corrosion of the coupons.

What is claimed:

1. A method of anodizing an aluminum substrate comprising pre-anodizing the substrate in an ammonium adipate electrolyte; cutting the substrate; heating the substrate to a first temperature of about 200° C. to about 380° C.; and then suspending the substrate into a first electrolyte and applying a first anodizing current to the first electrolyte, wherein the first electrolyte comprises an aqueous solution of at least one salt of alpha-hydroxy acid.

2. The method of claim 1 further comprising heating the substrate obtained in claim 1 to a second temperature of about 200° C. to about 380° C.; and then suspending the substrate into a second electrolyte and applying a second anodizing current to the second electrolyte, wherein the second electrolyte comprises an aqueous solution of at least one salt of alpha-hydroxy acid.

3. The method of claim 2 wherein the second temperature is from about 300° C. to about 375° C.

4. The method of claim 2 wherein the second electrolyte solution has a temperature of about 25° C. to about 90° C.

5. The method of claim 2 wherein the second electrolyte solution comprises at least one alpha-hydroxy acid is selected from the group consisting of citric acid, malic acid, and tartaric acid.

6. The method of claim 5 wherein the alpha-hydroxy acid is citric acid.

7. The method of claim 2 wherein the first electrolyte solution and second electrolyte solution are the same.

8. The method of claim 2 wherein the first electrolyte solution, second electrolyte solution, or both comprise ammonium citrate.

9. The method of claim 1 wherein the first temperature is from about 300° C. to about 375° C.

10. The method of claim 1 wherein the first electrolyte solution has a temperature of about 25° C. to about 90° C.

11. The method of claim 1 wherein the first electrolyte solution comprises at least one alpha-hydroxy acid is selected from the group consisting of citric acid, malic acid, and tartaric acid.

12. The method of claim 11 wherein the alpha-hydroxy acid is citric acid.

13. A method of edge anodizing an aluminum substrate having a cut edge comprising pre-anodizing the substrate in an ammonium adipate electrolyte; cutting the substrate; heating the substrate to a first temperature of about 200° C. to about 380° C.; suspending the substrate into a first electrolyte and applying a first anodizing current to the first electrolyte; rinsing the substrate; heating the substrate to a second temperature of about 200° C. to about 380° C.; and suspending the substrate into a second electrolyte and applying a second anodizing current to the second electrolyte, wherein the first electrolyte and second electrolyte each comprise an aqueous solution of at least one salt of alpha-hydroxy acid.

14. The method of claim 13 wherein the first temperature and second temperature are each from about 300° C. to about 375° C.

15. The method of claim 13 wherein the first electrolyte solution, second electrolyte solution, or both comprise an alpha-hydroxy salt of citric acid.

* * * * *

UNITED STATES PATENT AND TRADEMARK OFFICE
CERTIFICATE OF CORRECTION

PATENT NO. : 6,475,368 B2
DATED : November 5, 2002
INVENTOR(S) : Albert Kennedy Harrington et al.

It is certified that error appears in the above-identified patent and that said Letters Patent is hereby corrected as shown below:

<u>Title page,</u>
Item [54], Title, "METHOD OF AQUEOUS ANODIZING ALUMINUM SUBSTRATES OF SOLID CAPACITORS" has been replaced with -- METHOD OF AQUEOUS ANODIZING ALUMINUM SUBSTRATES FOR SOLID CAPACITORS --.

Signed and Sealed this

Third Day of June, 2003

JAMES E. ROGAN
*Director of the United States Patent and Trademark Office*